United States Patent
Bennett et al.

(10) Patent No.: US 9,996,384 B2
(45) Date of Patent: *Jun. 12, 2018

(54) VIRTUAL MACHINE HOMOGENIZATION TO ENABLE MIGRATION ACROSS HETEROGENEOUS COMPUTERS

(71) Applicant: MICROSOFT TECHNOLOGY LICENSING, LLC, Redmond, WA (US)

(72) Inventors: Robert Bradley Bennett, Bothell, WA (US); René A. Vega, Kirkland, WA (US); Shuvabrata Ganguly, Seattle, WA (US); Matthew Douglas Hendel, Seattle, WA (US); Rajesh Natvarlal Davé, Redmond, WA (US); Lars Reuther, Kirkland, WA (US); Tamás Gál, Bellevue, WA (US); Yuan Zheng, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/360,011

(22) Filed: Nov. 23, 2016

(65) Prior Publication Data

US 2017/0075716 A1    Mar. 16, 2017

Related U.S. Application Data

(63) Continuation of application No. 12/726,359, filed on Mar. 18, 2010, now Pat. No. 9,626,206.

(51) Int. Cl.
G06F 9/455   (2018.01)
G06F 9/48    (2006.01)
(Continued)

(52) U.S. Cl.
CPC ........ *G06F 9/45558* (2013.01); *G06F 3/0604* (2013.01); *G06F 3/0647* (2013.01);
(Continued)

(58) Field of Classification Search
None
See application file for complete search history.

(56) References Cited

U.S. PATENT DOCUMENTS 7,065,549 B2   6/2006 Sun et al.
7,222,221 B1 * 5/2007 Agesen ............... G06F 9/45537
                                                      707/999.2
(Continued)

OTHER PUBLICATIONS

"Virtual machine to Physical machine Migration", Retrieved at <http://www.vmware.com/support/v2p/doc/V2P_TechNote.pdf>, pp. 1-22.

(Continued)

*Primary Examiner* — Dong Kim

(57) ABSTRACT

Described is a technology by which a virtual machine may be safely migrated to a computer system with a different platform. Compatibility of the virtual machine may be checked by comparing the virtual machine's capabilities against those of the new platform. To ensure compatibility, when created the virtual machine may have its capabilities limited by the lowest common capabilities of the different platforms available for migration. Computer systems may be grouped into migration pools based upon similar capabilities, and/or a virtual machine may be mapped to certain computer systems based upon capabilities needed by that virtual machine, such as corresponding to needed performance, fault tolerance and/or flexibility.

20 Claims, 6 Drawing Sheets

(51) Int. Cl.
  *G06F 9/50* (2006.01)
  *G06F 3/06* (2006.01)

(52) U.S. Cl.
  CPC .......... *G06F 3/0664* (2013.01); *G06F 3/0683* (2013.01); *G06F 9/4856* (2013.01); *G06F 9/5055* (2013.01); *G06F 2009/4557* (2013.01)

(56) References Cited

U.S. PATENT DOCUMENTS

| | | | | |
|---|---|---|---|---|
| 7,356,679 | B1* | 4/2008 | Le | G06F 17/30067 707/E17.01 |
| 7,702,743 | B1* | 4/2010 | Wong | G06F 12/0284 709/216 |
| 7,757,214 | B1* | 7/2010 | Palczak | G06F 9/5083 709/223 |
| 2005/0268298 | A1* | 12/2005 | Hunt | G06F 9/4856 718/1 |
| 2006/0085784 | A1* | 4/2006 | Traut | G09B 5/00 718/1 |
| 2007/0169121 | A1 | 7/2007 | Hunt et al. | |
| 2007/0294676 | A1* | 12/2007 | Mellor | G06F 8/65 717/139 |
| 2009/0025007 | A1* | 1/2009 | Hara | G06F 3/0607 718/105 |
| 2009/0070760 | A1* | 3/2009 | Khatri | G06F 9/4856 718/1 |
| 2009/0070771 | A1* | 3/2009 | Yuyitung | G06Q 10/06 718/105 |
| 2009/0106409 | A1 | 4/2009 | Murata | |
| 2009/0150463 | A1 | 6/2009 | Sekiguchi et al. | |
| 2009/0150529 | A1 | 6/2009 | Tripathi | |
| 2009/0187713 | A1* | 7/2009 | Zedlewski | G06F 11/3409 711/130 |
| 2009/0313445 | A1* | 12/2009 | Pandey | G06F 9/4856 711/162 |
| 2009/0313455 | A1 | 12/2009 | Mansell et al. | |
| 2010/0235831 | A1* | 9/2010 | Dittmer | G06F 9/45558 718/1 |
| 2010/0299666 | A1* | 11/2010 | Agbaria | G06F 9/4856 718/1 |
| 2010/0306381 | A1* | 12/2010 | Lublin | G06F 15/16 709/226 |
| 2011/0035754 | A1* | 2/2011 | Srinivasan | G06F 9/4856 718/105 |
| 2011/0173303 | A1* | 7/2011 | Rider | G06F 9/44505 709/220 |

OTHER PUBLICATIONS

"Introduction to Virtual Machine Migration", Retrieved at <http://docs.hp.com/en/T2767-90067/ch10s01.html> retrieved Sep. 11, 2009, 2 pages.

Travostino, et al., "Seamless Live Migration of Virtual machines over the MAN/WAN", Retrieved at <http://www.francotravostino.name/papers/VMT.pdf>, Proceedings of the 2006ACM/IEEE conference on Supercomputing, Nov. 11-17, 2006, 10 pages.

https://en.wikipedia.org/wiki/Non-Uniform_Memory_Access;, Nov. 1, 2008.

http://www.intel.com/pressroom/archive/reference/whitepaper_QuickPath.pdf; Intel 2008, 6 pages.

https://web.archive.org/web/20091111080311/http://en.wikipedia.org/wiki/X86; Nov. 11, 2011, 1 page.

Mehnert, Frank, "Announcement VirtualBox 3.1 Beta 1 released" Retrieved at <http://www.virtualbox.org/pipemail/v-boxannounce/2009-November/000027.html>, Nov. 11, 2009, 2 pages.

Oracle Corporation, "Chapter 7 Remote virtual machines", Retrieved at <https://www.virtualbox.org/manual/ch07.html>, 2004-2016, 11 pages.

Oracle Corporation, "8.8.6 Teleporting settings" Retrieved at <https://www.virtualbox.org/manual/ch08.html#vboxmanage-modifyvm-teleport>, 2004-2016, 76 pages.

* cited by examiner

VIRTUAL MACHINE HOMOGENIZATION TO ENABLE MIGRATION ACROSS HETEROGENEOUS COMPUTERS

CROSS-REFERENCE TO RELATED APPLICATION

This application is a continuation of, claims the benefit of and priority to, previously filed U.S. patent application Ser. No. 12/726,359 entitled "VIRTUAL MACHINE HOMOGENIZATION TO ENABLE MIGRATION ACROSS HETEROGENEOUS COMPUTERS" filed on Mar. 18, 2010, the subject matter of which is hereby incorporated herein by reference in its respective entirety.

BACKGROUND

A virtual machine (VM) comprises software that executes on a host computer system to act as if it was a physical machine. A computer system may host multiple virtual machines, each running on a virtual machine monitor (VMM), also referred to as a hypervisor, that controls the sharing of the host's resources among the virtual machines. Typically virtual machines are run to utilize a physical machine's hardware resources more fully than can be done by conventional programs, and/or to run different operating systems on the same physical machine at the same time.

When a virtual machine is created, the virtual machine monitor typically exposes the underlying hardware features, topology and other characteristics to that virtual machine. This allows the virtual machine to fully utilize the capabilities of the platform on which it runs.

There are various reasons why it is sometimes desirable or necessary to migrate a virtual machine from one physical machine to another, without halting execution of that virtual machine (although there is some duration when it is unavailable). Such reasons include load balancing, maintenance, failover and so forth.

However, when a virtual machine is migrated in a heterogeneous computing environment, that is, among computing platforms with different capabilities, a variety of hardware-related and software-related problems can occur. For example, the new platform may not support the instruction set associated with specific processor features that the virtual machine was previously using, resulting in an application or operating system crash. Another problem is when the cache topology differs, e.g., there is a smaller cache line flush size on the new platform, which may result in data corruption issues. Still another problem is that a virtual machine may be optimized to use the Non-Uniform Memory Access (NUMA) topology and/or Non-Uniform I/O Access topology of one physical machine. If one or both of these topologies differs, degraded performance results.

With respect to software, the version of the virtual machine monitor on the new machine may be different from the previous platform's version, resulting in compatibility issues. Also, when a virtual machine is migrated to a differing platform, there may be operating system or application license activation issues.

In sum, in a heterogeneous computer environment, migrating a virtual machine can result in an underutilization of hardware resources, poor performance, system downtime and/or data loss.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which a virtual machine is migrated to a computer system with a different platform based upon the capabilities needed by a virtual machine and/or the capabilities available on the computer systems. Such capabilities may include a processor feature set, processor cache characteristics, control register characteristics, model-specific register characteristics, memory type range register characteristics, address range register characteristics, non-uniform memory access topologies, non-uniform I/O access topologies, virtual machine monitor version data, and/or licensing-related data.

In one aspect, compatibility is checked before migration is allowed. In another aspect, the platform-related capabilities of the virtual machine are intentionally limited to a lowest common set of platform-related capabilities available among computer systems to make the virtual machine compatible with any of the plurality of computer systems. For example, the CPU features that are returned to the virtual machine may be the lowest CPU features that every machine can support, which may differ based upon different CPU architectures and/or steppings, including between the architectures and/or steppings of a single processor vendor and/or different processor vendors.

In one aspect, computer systems may be grouped into migration pools based upon similar capabilities, whereby, for example, newer computer systems are not limited to the capabilities of older computer systems, but only the lowest capabilities within their migration pool. In another aspect, the virtual machines may be mapped to certain computer systems based upon capabilities needed by that virtual machine, such as based upon performance, fault tolerance and/or flexibility.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards facilitating the migration of a virtual machine among heterogeneous computing platforms in a manner that avoids the various problems resulting from different hardware and/or software among the platforms. To this end, there is described the identification of the capabilities of a group of heterogeneous platforms, the specification of the capabilities required by a virtual machine, and the creation of a virtual machine to use these capabilities, including the virtualization by the virtual machine monitor of the underlying hardware and/or software to support these capabilities. Also described are the persistence of the virtual machine's capabilities, and the verification of compatibility when migrating or restarting a virtual machine. In one aspect, there is described notifying the virtual machine of any changed capabilities after a virtual machine is migrated.

It should be understood that any of the examples described herein are non-limiting examples. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used in various ways that provide benefits and advantages in computing and/or virtual machine technology in general.

Figure 1:
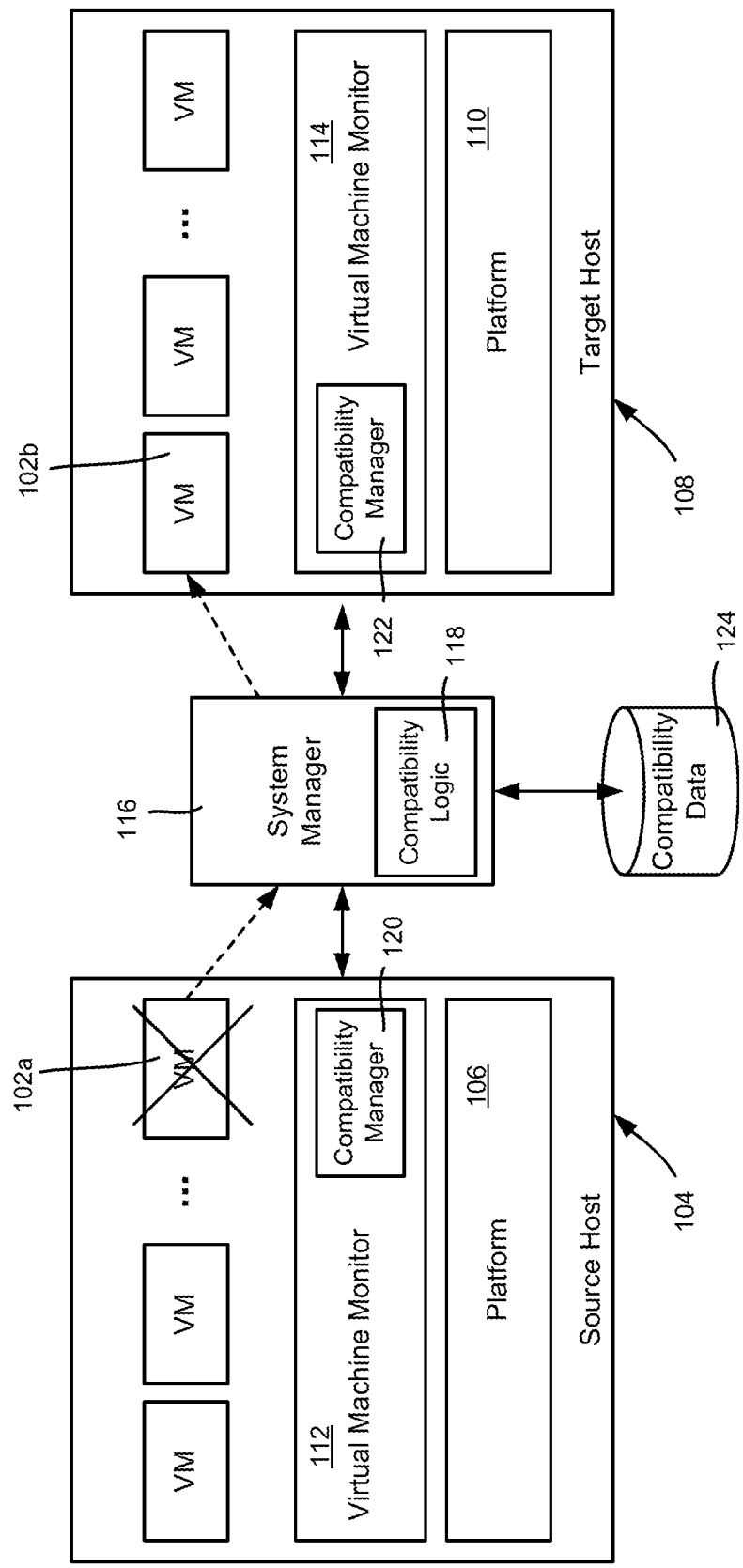
FIG. 1 is a block diagram showing example components for migrating a virtual machine in a manner that maintains compatibility across different platforms.

FIG. 1 shows various aspects related to migration of a virtual machine 102a from a source host 104 having one platform 106 to a target host 108 having another platform 110. As can be readily appreciated, if the platforms are the same there are no compatibility issues, and thus the description herein is directed towards different platforms 106 and 110 with respect to their respective hardware and/or software capabilities, including various features and/or characteristics described herein. Note that the virtual machine instance on the target host is labeled 102b in FIG. 1, even though it may be essentially unchanged except for its location.

As is known, each host runs a virtual machine monitor, labeled 112 and 114 in FIG. 1. Among other operations, a virtual machine monitor allows different types of virtual machines, such as those configured with different operating systems, versions, and so forth, to run on the platform. In general, each virtual machine's operating system may be unaware that it is running above a virtual machine monitor and may operate as if it was the only operating system running on the physical host computer system.

As described herein, a system manager 116 in conjunction with the virtual machine monitors 112 and 114 handle the migration in a way that ensures compatibility. To this end, the system manager 116 includes compatibility logic 118 that checks if a virtual machine is able to be migrated, and fails the requested migration if not.

Further, the virtual machine monitors 112 and 114 include compatibility managers 120 and 122, respectively, which can control the configuration of the virtual machines' capabilities to provide compatibility across platforms. More particularly, each compatibility manager is able to set the virtual machine's capabilities to the lowest common feature set/characteristic set based on the features and characteristics that are available among the heterogeneous platforms. Such capability-related information may be maintained as compatibility data 124 by the system manager 116.

One group of capabilities is related to the CPU in each platform. These include processor features such as the instruction set, control register characteristics, cache characteristics and so forth, and vary by processor vendor and implementation. As is known, the CPUID instruction returns data by which many of these features are determined for a given platform.

With respect to processor caches, the processor's cache architecture corresponds to CPUID leaves 2 and 4. If a virtual machine is running a cache-optimized application on a source host, migrating the virtual machine to a target host results in a performance reduction.

Moreover, if the cache line flush size is less on the target host than the source, data corruption will occur. Thus, the source and target host processor characteristics need to match:

CL Flush Size (CPUID 80000001.ebx.16-23)

As described above, one option is to fail a migration if the target host is unable to support the CPU features, e.g., because of an older CPU, or a CPU from a different vendor. However, an alternative is to virtualize the feature set on the source host so as to match the target host in anticipation of a future migration. To this end, the system manager determines the CPU features of each platform to which migration is possible for a given virtual machine (which may depend on the virtual machine's needed capabilities, as described below). From those features, the system manager selects the lowest set of common features based on which feature or features any given processor is unable to support. This lowest common of feature set selection may be done for different architectures/steppings of the same processor vendor, but may also be done across different vendors' processors.

Thus, for example, if among the processors all support SSE4.1 but one or more do not SSE4.2, then the lowest common feature set is SSE4.1. Any virtual machine that may be migrated to the machine or machines that do not support SSE4.2 will not see the SSE4.2 CPUID bit regardless of where that virtual machine is created or started. Note however that this only applies to virtual machines that may be migrated; a host may have one or more virtual machines rooted on the host that will not be migrated.

To limit a virtual machine's use of any feature greater than the corresponding one identified in the lowest common feature set, each compatibility manager of its respective virtual machine monitor is informed by the system manager as to the lowest common feature set. When a virtual machine is first created on a host, the creator (e.g., an administrator or automated process) has the ability to create the virtual machine in a processor compatibility mode. If created in this mode, the host's virtual machine monitor intercepts the virtual machine's CPUID requests for determining the processor features, and basically responds with the lowest common feature set as appropriate. To accomplish this, the virtual machine monitor clears any bit that is set in an actual response to a CPUID request if that bit is not set in the common feature set, for example.

Figure 2:
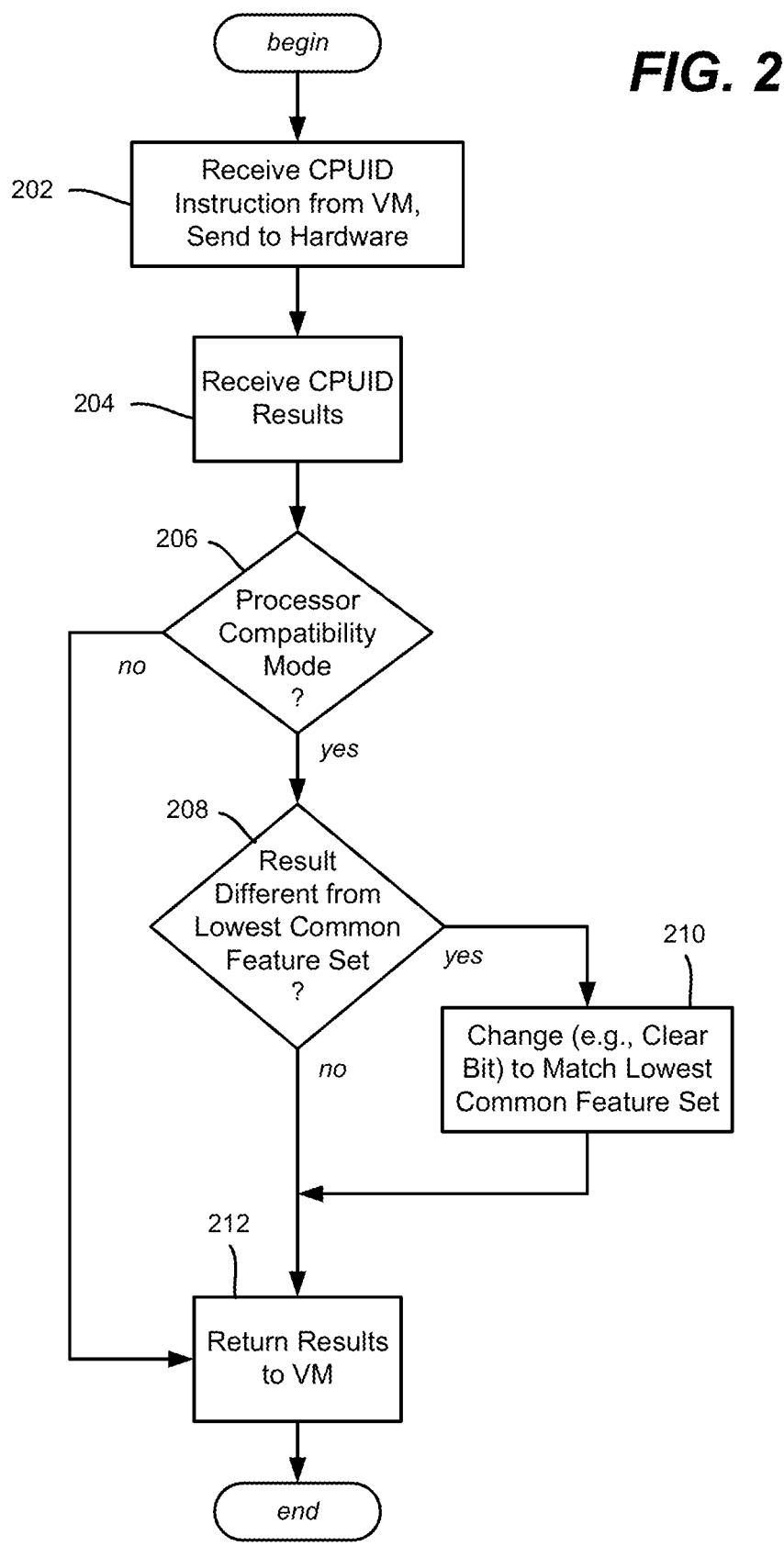
FIG. 2 is a flow diagram representing example steps to virtualize a processor's feature set to match those that are common among different platforms and thereby ensure compatibility.

FIG. 2 summarizes the lowest common feature set operations of the virtual machine monitor, beginning at step 202 where the virtual machine (VM) executes the CPUID instruction, requesting feature information. At step 204, the virtual machine monitor intercepts the execution of the CPUID instruction.

Step 206 evaluates whether this virtual machine is being created with the processor compatibility mode option selected. If not, the results are returned as is to the virtual machine at step 212.

If the processor compatibility mode option is selected, then steps 208 and 210 represent changing any differing feature based on the lowest common feature set, before returning the results at step 212.

Some processors provide the ability to directly override the CPUID value directly, without intercepting the CPUID instruction execution, by writing a special model-specific register (MSR). The virtual machine monitor may use this mechanism to clear any CPUID bits when a virtual processor is run.

Some processors provide the ability to disable an instruction set associated with a processor feature. In addition to clearing the CPUID bit, the virtual machine monitor can use this to disable the associated instruction set to enforce the use of the feature.

Similar to when a virtual machine is created, an existing virtual machine may be re-configured into processor compatibility mode.

Note that for some feature operations, the virtual machine monitor may emulate the instruction set. For example, in one implementation, the virtual machine monitor emulates the prefetch and prefetchw instructions. Any such instructions that are emulated among the platforms for which virtual machine migration is allowed need not be limited by virtualization.

In addition to processor features, other processor characteristics may be virtualized. For example, if two platforms have different cache line flush sizes, the minimum cache line flush size is returned as a lowest common characteristic/feature. Model-specific registers, memory type range registers (MTRR) and address range registers (ARR) may be similarly matched to a lowest common characteristic, e.g., to only expose registers to a virtual machine that are common across the platforms. A processor's XSAVE (related to processor extended state) capabilities, e.g., whether XSAVE is supported, and if so, which extensions, may also be matched to a lowest common capability. Further, reserved control register (e.g., CR4) bits may need to be set to zero, because a virtual machine attempt to set a reserved bit to one may result in a processor exception depending on the processor. For example, one platform may enable the use of CR bits, while another does not. As a more particular example, XSAVE-enabled platforms define the CR4 bit as OSXSAVE, while non-XSAVE-enabled platforms reserve this bit.

Other hardware-related compatibility issues arise from differing non-uniform memory access (NUMA) topologies. In general, with NUMA, processors and memory are configured in distinct nodes such that each processor is closer to the memory in its own node than memory in another node. For better performance, an operating system attempts to use the memory closer to a processor when possible by scheduling threads on processors that are in the same node as the memory being used, and only allocating memory from other nodes if necessary.

Applications may use NUMA APIs to determine the node topology so as to optimize scheduling and memory usage. Similar to NUMA, operating systems/applications also may optimize for non-uniform I/O access, e.g., by affinitizing interrupts or using directly coupled I/O controllers or the like.

However, the topology or topologies may differ across platforms, which may make an operating system/application configured for one topology to become inefficient when its virtual machine is migrated to another platform. One way to avoid this problem is to tell the operating system/application running within a virtual machine that non-uniform memory access and/or non-uniform I/O access is not available if not available on each computer system. Another is to provide a virtual NUMA topology based on the physical NUMA topology of the computer systems.

Software compatibility issues may arise from having different virtual machine monitor versions. To enable migration, virtual machine monitors may be backwards and forwards compatible, such as to switch to a version or code path that works with virtual machines created by and older version virtual machine monitor. In addition, the virtual machine monitor may create a virtual machine with a limited feature set and format to allow the virtual machine to migrate to an older version machine monitor.

Somewhat similar, the virtual machine may adjust. Although existing operating system versions may not realize when they are run as a virtual machine (rather than as a conventional operating system), other operating system versions may be virtual machine-aware. Such versions can adjust to the virtual machine monitor running on a different platform. For example, a virtual machine running on a newer version of a virtual machine monitor can recognize when migrated to run on an older version, and adjust accordingly.

Licensing issues also may arise, in that operating system/application checks can limit or disable functionality when running in a virtual machine that runs on a different platform from the platform from which the virtual machine was originally activated, for example. These may be handled by having the checks adjust for virtual machine migration, e.g., licensing an operating system for use as virtual machines within a group of physical machine platforms. This may also be handled by the virtual machine monitor virtualizing the processor or system features upon which the activation checks are based on.

Figure 3:
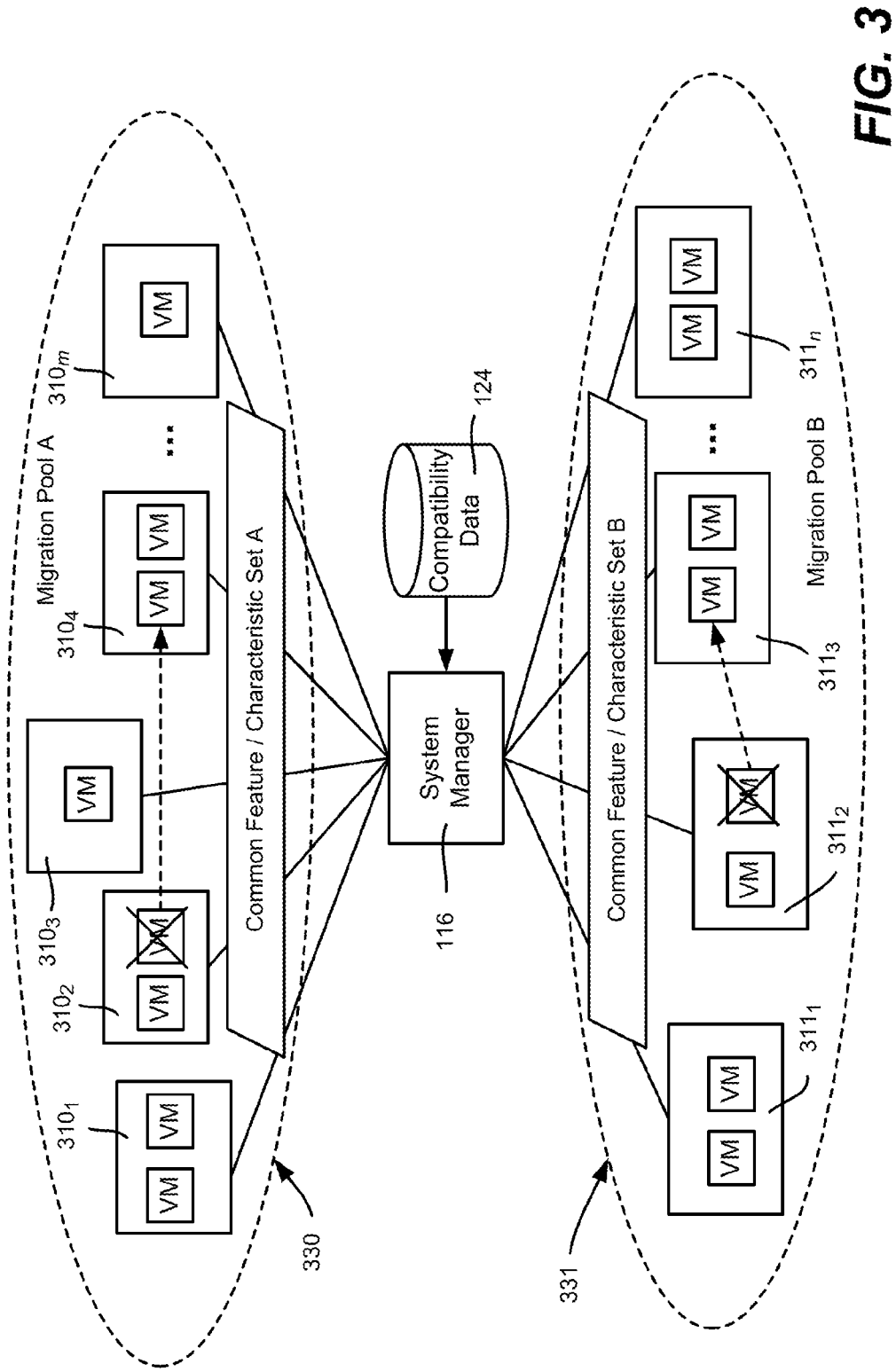
FIG. 3 is a block diagram showing how different platforms may be pooled together based on common capabilities such that migration within a pool avoids compatibility-related issues.

FIG. 3 shows another aspect, in which platforms are pooled into migration pools based on their common feature sets/characteristics, with virtual machines only allowed to migrate among platforms in their own migration pool. This allows controlling how much each computer system has to be limited. For example, an enterprise may want to group its computer systems having the newest features and characteristics together, so that the lowest common capabilities are still relatively high in that group, (rather than having those computer systems significantly limited by the lesser capabilities of one or more other computer systems).

Thus, platforms $310_1$-$310_m$ belong to migration pool A (also labeled 330) while platforms $311_1$-$311_n$ belong to migration pool A (also labeled 331). These associations may be maintained in the compatibility data 124, whereby the system manager 116 does not attempt a virtual machine migration across migration pool boundaries.

Note that FIG. 3 shows two distinct migration pools, however there may be any practical number in a given enterprise environment. For example, one migration pool may comprise those computers that more efficiently serve content, another may comprise those computers that handle database queries, another may comprise whatever older computers that the enterprise has available for performing other desired tasks, and so on.

In general, an administrator or the like may determine the capabilities needed for a virtual machine, such as by interacting with a user interface. For example, if a virtual machine is to be used to serve streaming video, then a platform having an instruction set that includes efficient instructions related to multimedia (e.g., SSE4 or greater) may be designated as needed. Note that the user interface may allow needed features to be individually selected, or may automatically select multiple features based on a general need/application, such as to match a profile selection (e.g., high performance versus high flexibility versus fault tolerance) and/or may use a slider or the like. Manual overriding of the individual feature selections may be allowed.

Based on such selections, a set of one or more computing platforms that match these specified capabilities may be located by the system manager. A migration pool may be made from these matching platforms.

Figure 4:
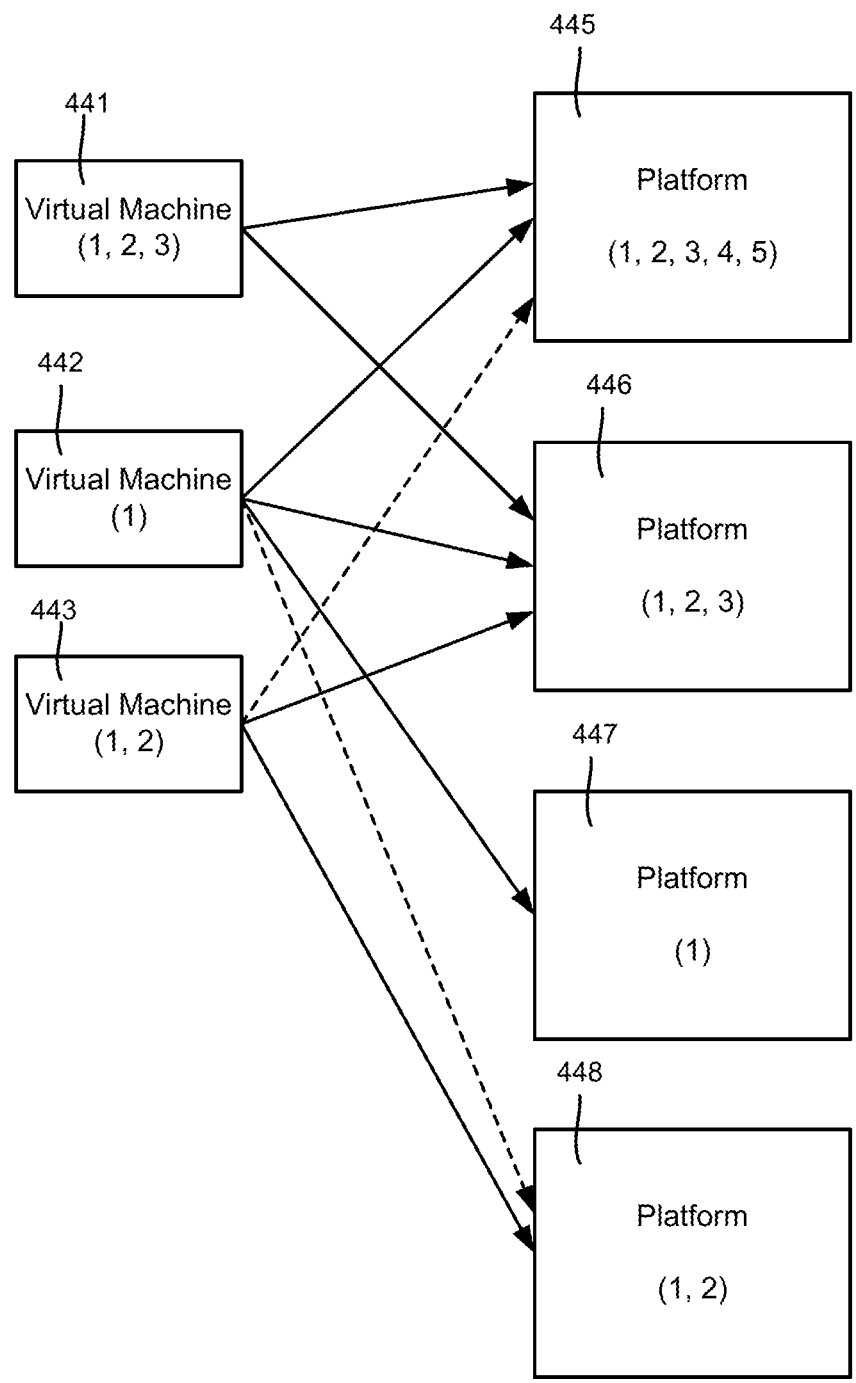
FIG. 4 is a block diagram representing how virtual machines may be mapped to different platforms based on needed capabilities of each virtual machine versus those provided by each platform.

Instead of grouping machines as in the migration pool-based implementation of FIG. 3, another way to match needed capabilities is represented in FIG. 4. In FIG. 4, each of the virtual machines 441-443 may be migrated to only certain of the platforms 445-448 based upon each platform's ability to match (meet or exceed) needed capabilities. For example, consider that to efficiently operate, the virtual machine 441 needs to have features (1, 2, 3) as shown in parentheses. Platforms 445 and 446 have at least these features, while platforms 447 and 448 do not. Thus, the system manager 116 maintains data for mapping the virtual machine 441 to only that subset, machines 445 and 446, and also may maintain data that specifies that the virtual machine needs to be created with the lowest common feature set (1, 2, 3) of that subset.

Note that the virtual machine 442 is compatible with any platform, as it only needs feature (1), while the virtual machine 443 is compatible with any platform except platform 447 (which does not have needed feature (2)). However, an administrator may choose to not allow the migration of a virtual machine to every platform with which it is compatible, so that, for example, the resources of platform 445 are not consumed by virtual machines that can run on less-capable platforms, leaving those platforms' resources available for virtual machines that do need them. This is indicated in FIG. 4 via the dashed arrows, which represent virtual machines that may be mapped to platforms with respect to migration, but are not.

Figure 5:
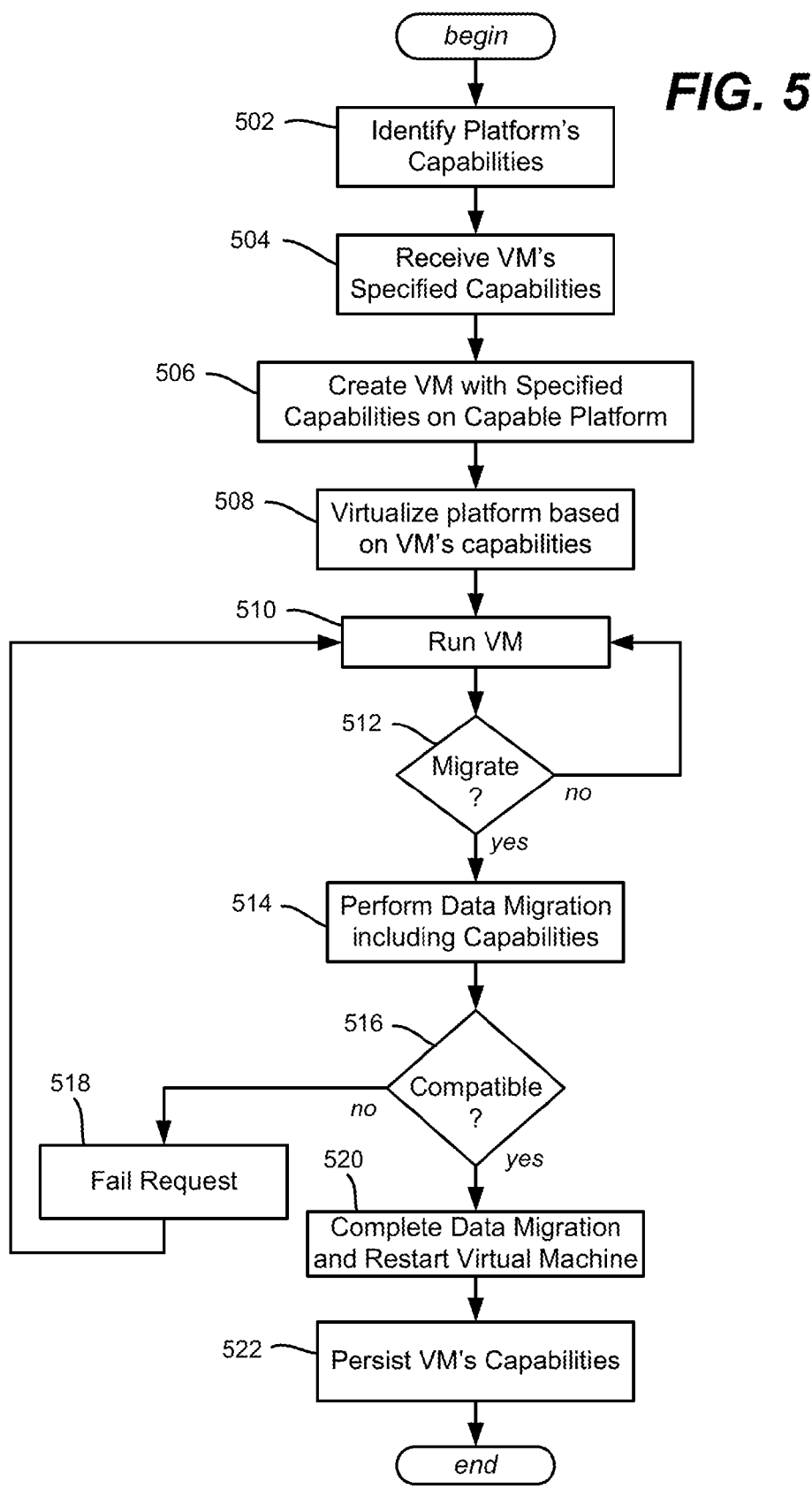
FIG. 5 is a flow diagram showing example steps that may be taken during virtual machine migration to retain compatibility across platforms.

FIG. 5 summarizes a number of concepts in an example flow of operations, beginning at step 502 where one or more platform's capabilities are identified. At step 504, the virtual machine's capabilities are received, such as provided by an administrator (or automated to match a prior virtual machine).

Step 506 represents finding a platform that matches the virtual machine's specified capabilities, and creating the virtual machine on that platform. As part of the creation, step 508 represents the virtualization of the platform, e.g., using the lowest common capabilities (features and characteristics) of the possible platforms on which this virtual machine may be migrated to run.

Step 510 represents running the virtual machine on the platform on which it was created, which (typically) continues until a migration is requested as evaluated by step 512. Note that step 510 includes rebooting the virtual machine on the same platform; failures and are not considered in this simplified example, except to the extent that a failure results in a migration.

If a request to migrate is obtained at step 512, step 514 starts migrating the data, including the virtual machine data and state, as well as the capabilities of the virtual machine, including, for example, the (possibly-adjusted) CPUID instruction results. Note that the capabilities may be sent first, to avoid transferring any other data to a target host that is not compatible.

Step 516 checks compatibility of the target host against the virtual machine capability data sent to it. Note that even if the target host to which the virtual machine is being migrated is known by the system manager to be one with the same or greater capabilities that the source, e.g., from previously collecting and maintaining such information, the check may still be performed by the target host because of possible hardware and/or software changes to the target host. If not compatible, the request is failed at step 518 and the virtual machine may continue to run on the source, possibly again requesting migration to a different target host.

If the target host is compatible, migration of the other data and state may be performed in any number of ways, including live migration that occurs very rapidly (e.g., less than one second) from the perspective of a client of the virtual machine, generally by pre-copying most of the virtual machine's data and state to the new platform and switching to run on the new platform with only a small amount of final data/state changes. Step 520 represents completing the data transfer and resuming the virtual machine on the new platform.

Step 522 represents persisting the capabilities on the platform. The capabilities thus remain with the virtual machine across any reboot, restart and so on, and can be checked for compatibility as needed.

Turning to another aspect, as described above, an operating system may be virtual machine-aware with respect to migration; so may applications. If so, the virtual machine monitor can provide pre and post notifications to the virtual machine of the migration, whereby the operating system has an opportunity to reconfigure based on new or changed capabilities. For example, the operating system may itself adapt to use the new capabilities, and/or may notify registered applications to switch to the new capabilities, and so forth.

As another example, the services that an operating system runs may depend on the available features. Thus, a service may be stopped, another one may be started and so on in response to a migration. The operating system also may work with certain applications in the same way.

Exemplary Operating Environment

Figure 6:
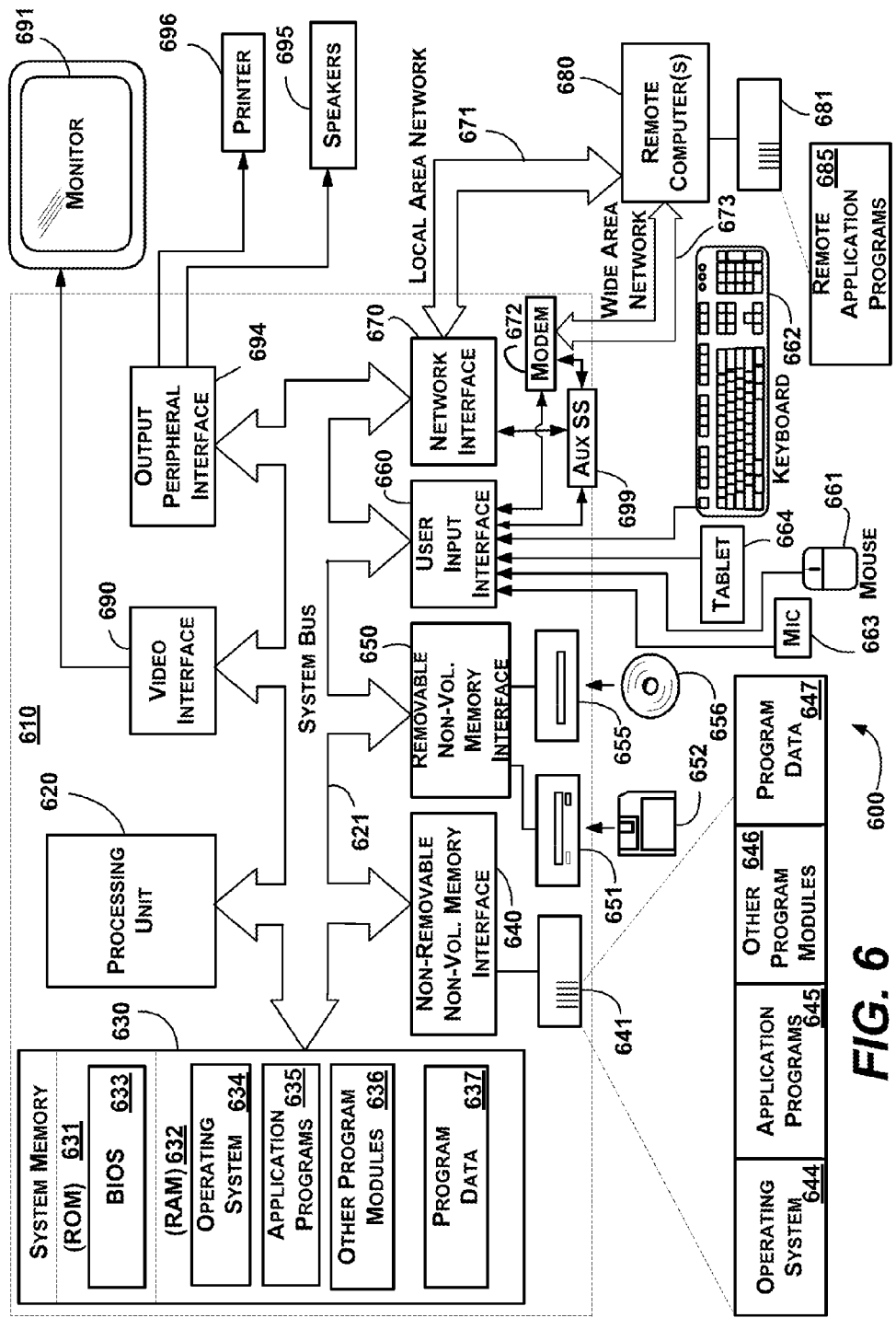
FIG. 6 shows an illustrative example of a computing environment into which various aspects of the present invention may be incorporated.

FIG. 6 illustrates an example of a suitable computing and networking environment 600 on which the examples of FIGS. 1-5 may be implemented. The computing system environment 600 is only one example of a suitable computing environment and is not intended to suggest any limitation as to the scope of use or functionality of the invention. Neither should the computing environment 600 be interpreted as having any dependency or requirement relating to any one or combination of components illustrated in the exemplary operating environment 600.

The invention is operational with numerous other general purpose or special purpose computing system environments or configurations. Examples of well-known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments, smartphones, embedded controllers that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 6, an exemplary system for implementing various aspects of the invention may include a general purpose computing device in the form of a computer 610. Components of the computer 610 may include, but are not limited to, a processing unit 620, a system memory 630, and a system bus 621 that couples various system components including the system memory to the processing unit 620. The system bus 621 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 610 typically includes a variety of computer-readable media. Computer-readable media can be any available media that can be accessed by the computer 610 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 610. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media.

The system memory 630 includes computer storage media in the form of volatile and/or nonvolatile memory such as read only memory (ROM) 631 and random access memory (RAM) 632. A basic input/output system 633 (BIOS), containing the basic routines that help to transfer information between elements within computer 610, such as during start-up, is typically stored in ROM 631. RAM 632 typically contains data and/or program modules that are immediately accessible to and/or presently being operated on by processing unit 620. By way of example, and not limitation, FIG. 6 illustrates operating system 634, application programs 635, other program modules 636 and program data 637.

The computer 610 may also include other removable/non-removable, volatile/nonvolatile computer storage media. By way of example only, FIG. 6 illustrates a hard disk drive 641 that reads from or writes to non-removable, nonvolatile magnetic media, a magnetic disk drive 651 that reads from or writes to a removable, nonvolatile magnetic disk 652, and an optical disk drive 655 that reads from or writes to a removable, nonvolatile optical disk 656 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 641 is typically connected to the system bus 621 through a non-removable memory interface such as interface 640, and magnetic disk drive 651 and optical disk drive 655 are typically connected to the system bus 621 by a removable memory interface, such as interface 650.

The drives and their associated computer storage media, described above and illustrated in FIG. 6, provide storage of computer-readable instructions, data structures, program modules and other data for the computer 610. In FIG. 6, for example, hard disk drive 641 is illustrated as storing operating system 644, application programs 645, other program modules 646 and program data 647. Note that these components can either be the same as or different from operating system 634, application programs 635, other program modules 636, and program data 637. Operating system 644, application programs 645, other program modules 646, and program data 647 are given different numbers herein to illustrate that, at a minimum, they are different copies. A user may enter commands and information into the computer 610 through input devices such as a tablet, or electronic digitizer, 664, a microphone 663, a keyboard 662 and pointing device 661, commonly referred to as mouse, trackball or touch pad. Other input devices not shown in FIG. 6 may include a joystick, game pad, satellite dish, scanner, or the like. These and other input devices are often connected to the processing unit 620 through a user input interface 660 that is coupled to the system bus, but may be connected by other interface and bus structures, such as a parallel port, game port or a universal serial bus (USB). A monitor 691 or other type of display device is also connected to the system bus 621 via an interface, such as a video interface 690. The monitor 691 may also be integrated with a touch-screen panel or the like. Note that the monitor and/or touch screen panel can be physically coupled to a housing in which the computing device 610 is incorporated, such as in a tablet-type personal computer. In addition, computers such as the computing device 610 may also include other peripheral output devices such as speakers 695 and printer 696, which may be connected through an output peripheral interface 694 or the like.

The computer 610 may operate in a networked environment using logical connections to one or more remote computers, such as a remote computer 680. The remote computer 680 may be a personal computer, a server, a router, a network PC, a peer device or other common network node, and typically includes many or all of the elements described above relative to the computer 610, although only a memory storage device 681 has been illustrated in FIG. 6. The logical connections depicted in FIG. 6 include one or more local area networks (LAN) 671 and one or more wide area networks (WAN) 673, but may also include other networks. Such networking environments are commonplace in offices, enterprise-wide computer networks, intranets and the Internet.

When used in a LAN networking environment, the computer 610 is connected to the LAN 671 through a network interface or adapter 670. When used in a WAN networking environment, the computer 610 typically includes a modem 672 or other means for establishing communications over the WAN 673, such as the Internet. The modem 672, which may be internal or external, may be connected to the system bus 621 via the user input interface 660 or other appropriate mechanism. A wireless networking component such as comprising an interface and antenna may be coupled through a suitable device such as an access point or peer computer to a WAN or LAN. In a networked environment, program modules depicted relative to the computer 610, or portions thereof, may be stored in the remote memory storage device. By way of example, and not limitation, FIG. 6 illustrates remote application programs 685 as residing on memory device 681. It may be appreciated that the network connections shown are exemplary and other means of establishing a communications link between the computers may be used.

An auxiliary subsystem 699 (e.g., for auxiliary display of content) may be connected via the user interface 660 to allow data such as program content, system status and event notifications to be provided to the user, even if the main portions of the computer system are in a low power state. The auxiliary subsystem 699 may be connected to the modem 672 and/or network interface 670 to allow communication between these systems while the main processing unit 620 is in a low power state.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:
1. In a computing environment, a method performed on at least one processor, comprising:
   identifying at least two of a plurality of computer systems having different hardware-related capabilities;
   limiting a virtual machine on a computer system of the plurality of computer systems to a compatible set of hardware-related characteristics that is present among at least one of the plurality of computer systems to make the virtual machine compatible with any of the plurality of computer systems, the hardware-related characteristics including non-uniform memory access topologies, or non-uniform I/O access topologies, or both non-uniform memory access topologies and non-uniform I/O access topologies; and
   migrating the virtual machine from the computer system of the plurality of computer systems to another computer system of the plurality of computer systems.
2. The method of claim 1 wherein limiting the virtual machine comprises virtualizing a processor feature set provided to the virtual machine to match a lowest common processor feature set that is present among the plurality of computer systems.
3. The method of claim 2 wherein virtualizing the processor feature set comprises selecting features common between different processors of a single vendor, selecting features common between different processors of different vendors, or both selecting features common between different processors of a single vendor and selecting features common between different processors of different vendors.
4. The method of claim 1 wherein limiting the virtual machine comprises virtualizing processor cache characteristics to match a lowest common set of processor cache characteristics that is present among the plurality of computer systems.
5. The method of claim 1 wherein limiting the virtual machine comprises virtualizing processor-related characteristics to match a lowest common set of processor-related characteristics that is present among the plurality of computer systems, the processor-related characteristics including characteristics of control registers, model-specific registers, memory type range registers or address range registers, or any combination of control registers, model-specific registers, memory type range registers or address range registers.
6. The method of claim 1 wherein limiting the virtual machine comprises virtualizing hardware-related characteristics to match a lowest common set of hardware-related characteristics that is present among the plurality of computer systems, the hardware-related characteristics including non-uniform memory access topologies, or non-uniform I/O access topologies, or both non-uniform memory access topologies and non-uniform I/O access topologies, and further comprising providing a virtual non-uniform memory access topology based on a physical non-uniform memory access topology of the plurality of computer systems.
7. The method of claim 1 further comprising, providing a virtual machine monitor that is compatible with a plurality of versions of virtual machines, or providing a virtual machine operating system that is compatible with a plurality of versions of virtual machine monitors, or both providing a virtual machine monitor that is compatible with a plurality of versions of virtual machines and providing a virtual machine operating system that is compatible with a plurality of versions of virtual machine monitors.
8. The method of claim 1 wherein migrating the virtual machine includes verifying the compatibility of the virtual machine on the other computer system to which the virtual machine is being migrated.
9. The method of claim 1 further comprising, persisting capability data of the virtual machine on the other computer system to which the virtual machine is being migrated.
10. The method of claim 1 further comprising, configuring the virtual machine with a virtual machine-aware operating system that is operative to adjust to a virtual machine monitor version.
11. The method of claim 1 further comprising, grouping computer systems based upon the hardware-related characteristics to provide a migration pool comprising the plurality of computer systems.
12. In a computing environment, a system comprising:
   a processing circuit; and
   memory comprising a system manager coupled to a virtual machine monitor on each of the plurality of computer systems, the system manager being executed on the processing circuit to:

identify at least two of a plurality of computer systems having different hardware-related capabilities;

limit a virtual machine on a computer system of the plurality of computer systems to a compatible set of hardware-related characteristics that is present among at least one of the plurality of computer systems to make the virtual machine compatible with any of the plurality of computer systems, the hardware-related characteristics including non-uniform memory access topologies, or non-uniform I/O access topologies, or both non-uniform memory access topologies and non-uniform I/O access topologies; and migrate the virtual machine from the computer system of the plurality of computer systems to another computer system of the plurality of computer systems.

13. The system of claim 12 wherein the system manager is to limit the virtual machine by virtualizing a processor feature set provided to the virtual machine to match a lowest common processor feature set that is present among the plurality of computer systems.

14. The system of claim 13 wherein the system manager is to virtualize the processor feature set by selecting features common between different processors of a single vendor, selecting features common between different processors of different vendors, or both selecting features common between different processors of a single vendor and selecting features common between different processors of different vendors.

15. The system of claim 12 wherein the system manager is to verify the compatibility of the virtual machine on the other computer system to which the virtual machine is being migrated.

16. The system of claim 12 further comprising at least one of a virtual machine monitor that is compatible with a plurality of versions of virtual machines, or a virtual machine operating system that is compatible with a plurality of versions of virtual machine monitors.

17. The system of claim 12 wherein the system manager is to virtualize hardware-related characteristics to match a lowest common set of hardware-related characteristics that is present among the plurality of computer systems, the hardware-related characteristics including non-uniform memory access topologies, or non-uniform I/O access topologies, or both non-uniform memory access topologies and non-uniform I/O access topologies, and further comprising providing a virtual non-uniform memory access topology based on a physical non-uniform memory access topology of the plurality of computer systems.

18. The system of claim 12 wherein the system manager is to configure the virtual machine with a virtual machine-aware operating system that is operative to adjust to a virtual machine monitor version.

19. The system of claim 12 wherein the system manager is to group computer systems based upon the hardware-related characteristics to provide a migration pool comprising the plurality of computer systems.

20. The system of claim 12 wherein the system manager is to persist capability data of the virtual machine on the other computer system to which the virtual machine is being migrated.

* * * * *